US009754585B2

(12) United States Patent
Brockett et al.

(10) Patent No.: US 9,754,585 B2
(45) Date of Patent: Sep. 5, 2017

(54) CROWDSOURCED, GROUNDED LANGUAGE FOR INTENT MODELING IN CONVERSATIONAL INTERFACES

(75) Inventors: Christopher John Brockett, Bellevue, WA (US); Piali Choudhury, Sammamish, WA (US); William Brennan Dolan, Kirkland, WA (US); Yun-Cheng Ju, Bellevue, WA (US); Patrick Pantel, Bellevue, WA (US); Noelle Mallory Sophy, Redmond, WA (US); Svitlana Volkova, Baltimore, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 13/438,751

(22) Filed: Apr. 3, 2012

(65) Prior Publication Data
US 2013/0262114 A1    Oct. 3, 2013

(51) Int. Cl.
*G10L 15/00* (2013.01)
*G10L 15/18* (2013.01)
*G10L 15/22* (2006.01)

(52) U.S. Cl.
CPC .............. *G10L 15/18* (2013.01); *G10L 15/22* (2013.01)

(58) Field of Classification Search
CPC ...... G06F 17/21; G06F 17/2247; G06F 17/27; G06F 17/2775; G06F 17/2795; G06F 17/30654; G06F 17/30864; G06F 17/30882; G10L 15/183; G10L 15/193; G10L 15/197

USPC .... 704/243, 277, 270.1, 257, 235, 209, 200; 715/853, 758, 256, 254, 234; 709/204; 707/794, 769, 760, 706
See application file for complete search history.

(56) References Cited

U.S. PATENT DOCUMENTS

| | | | | |
|---|---|---|---|---|
| 6,151,571 | A  * | 11/2000 | Pertrushin | G10L 17/26 704/207 |
| 6,640,241 | B1 * | 10/2003 | Ozzie | H04L 12/1813 709/204 |
| 7,249,328 | B1 * | 7/2007 | Davis | G06F 17/212 707/999.202 |
| 7,421,648 | B1 * | 9/2008 | Davis | G06F 17/30882 707/E17.013 |
| 7,584,092 | B2 | 9/2009 | Brockett et al. | |
| 7,937,265 | B1 | 5/2011 | Pasca et al. | |
| 7,966,305 | B2 * | 6/2011 | Olsen | G06F 17/30864 707/706 |

(Continued)

OTHER PUBLICATIONS

Vertanen, et al., "The Imagination of Crowds: Conversational AAC Language Modeling using Crowdsourcing and Large Data Sources", In Proceedings of the Conference on Empirical Methods in Natural Language Processing, Jul. 27-31, 2011, 12 pages.

(Continued)

*Primary Examiner* — Michael Colucci

(57) ABSTRACT

Different advantageous embodiments provide a crowdsourcing method for modeling user intent in conversational interfaces. One or more stimuli are presented to a plurality of describers. One or more sets of describer data are captured from the plurality of describers using a data collection mechanism. The one or more sets of describer data are processed to generate one or more models. Each of the one or more models is associated with a specific stimulus from the one or more stimuli.

20 Claims, 3 Drawing Sheets

(56) References Cited

U.S. PATENT DOCUMENTS

| | | | |
|---|---|---|---|
| 8,245,135 B2* | 8/2012 | Cai | G06F 17/30884 707/708 |
| 8,527,534 B2* | 9/2013 | Wang | G06F 17/30654 707/748 |
| 8,566,708 B1* | 10/2013 | Pereira | G06F 17/21 715/256 |
| 8,655,901 B1* | 2/2014 | Li | G06F 17/30864 704/7 |
| 2002/0032564 A1* | 3/2002 | Ehsani | G06F 17/2775 704/235 |
| 2003/0144846 A1* | 7/2003 | Denenberg | G06F 17/2775 704/277 |
| 2006/0015320 A1 | 1/2006 | Och | |
| 2006/0053001 A1 | 3/2006 | Brockett et al. | |
| 2006/0106592 A1 | 5/2006 | Brockett et al. | |
| 2006/0106594 A1 | 5/2006 | Brockett et al. | |
| 2006/0106595 A1 | 5/2006 | Brockett et al. | |
| 2006/0235694 A1* | 10/2006 | Cross | G06F 17/30861 704/270.1 |
| 2007/0067159 A1* | 3/2007 | Basu | G10L 25/51 704/200 |
| 2008/0192736 A1 | 8/2008 | Jabri et al. | |
| 2008/0208849 A1 | 8/2008 | Conwell | |
| 2009/0299724 A1 | 12/2009 | Deng et al. | |
| 2010/0048242 A1 | 2/2010 | Rhoads | |
| 2010/0057463 A1* | 3/2010 | Weng | G06F 17/27 704/257 |
| 2010/0138216 A1 | 6/2010 | Tanev | |
| 2010/0161384 A1 | 6/2010 | Wells | |
| 2011/0060587 A1* | 3/2011 | Phillips | G10L 15/30 704/235 |
| 2011/0072052 A1* | 3/2011 | Skarin | G06Q 10/10 707/794 |
| 2011/0082684 A1 | 4/2011 | Soricut et al. | |
| 2011/0154224 A1* | 6/2011 | Bates | G06Q 10/10 715/758 |
| 2011/0161076 A1 | 6/2011 | Davis et al. | |
| 2011/0173214 A1 | 7/2011 | Karim | |
| 2011/0238670 A1 | 9/2011 | Mercuri | |
| 2011/0258560 A1 | 10/2011 | Mercuri et al. | |
| 2011/0295591 A1 | 12/2011 | Fang et al. | |
| 2012/0071785 A1* | 3/2012 | Forbes | G06F 19/363 600/558 |
| 2012/0209613 A1* | 8/2012 | Agapi | G10L 21/00 704/270.1 |
| 2012/0236201 A1* | 9/2012 | Larsen | H04N 21/235 348/468 |
| 2013/0084891 A1* | 4/2013 | Khorashadi | G01S 5/0252 455/456.3 |

OTHER PUBLICATIONS

Grady, et al., "Crowdsourcing Document Relevance Assessment with Mechanical Turk", In Proceedings of the NAACL HLT Workshop on Creating Speech and Language Data with Amazon's Mechanical Turk, Jun. 2010, 8 pages.

Ambati, et al., "Active Learning and Crowd-Sourcing for Machine Translation", In Proceedings of the Seventh International Conference on Language Resources and Evaluation, May 19-21, 2010, 6 pages.

Rossen, et al., "Human-Centered Distributed Conversational Modeling: Efficient Modeling of Robust Virtual Human Conversations", In Proceedings of the 9th International Conference on Intelligent Virtual Agents, vol. 5773, Sep. 14-16, 2009, 8 pages.

Xbox, "Avatar Editor", Retrieved Date: Dec. 15, 2011, 1 page. Available at: http://live.xbox.com/en-US/AvatarEditor.

Callison-Burch, et al., "Creating Speech and Language Data With Amazon's Mechanical Turk", NAACL HLT 2010 Workshop on Creating Speech and Language Data with Amazon's Mechanical Turk, Los Angeles, CA, Jun. 2010, 12 pages.

Ambati, et al., "Active Learning and Crowd-Sourcing for Machine Translation", 2010, 6 pages. Retrieved at: http:/fciteseerx.ist.psu.edu/viewdoc/download?doi=10.1.1.164.9485&rep=rep1&type=pdf.

The Journal of Internationalisation and Localisation, vol. 1, "Evolution of User-Generated Translation: Fansubs, Translation Hacking and Crowdsourcing", 2009, 193 pages. Retrieved at: http:/fpmstrad.com/wp-contenUJIAL_ 2009_ 1_2009_APA. pdf#page= 102.

Parent, et al., "Clustering Dictionary Definitions Using Amazon Mechanical Turk", NAACL HLT 2010 Workshop on Creating Speech and Language Data with Amazon's Mechanical Turk, Los Angeles, CA, Jun. 2010, 9 pages.

Sarikaya, et al., "Iterative Sentence-Pair Extraction from Quasi-Parallel Corpora for Machine Translation", Sep. 6-10, 2009, 4 pages. Retrieved at: http://fwww.cs.columbia .edu/-smaskey/papers/sent_ select_mt.pdf.

Buzek, et al., "Error Driven Paraphrase Annotation Using Mechanical Turk", NAACL HLT 2010 Workshop on Creating Speech and Language Data with Amazon's Mechanical Turk, Los Angeles, CA, Jun. 2010, 5 pages.

Callison-Burch, et al., "Improved Statistical Machine Translation Using Paraphrases", Human Language Technology Conference of the North American Chapter of the ACL, New York, Jun. 2006, 8 pages.

Marton et al., "Improved Statistical Machine Translation Using Monolingually-Derived Paraphrases", Conference on Empirical Methods in Natural Language Processing, Singapore, Aug. 6-7, 2009, 10 pages.

Denkowski, et al., "Turker-Assisted Paraphrasing for English-Arabic Machine Translation", NAACL HLT 2010 Workshop on Creating Speech and Language Data with Amazon's Mechanical Turk, Los Angeles, CA, Jun. 2010, 5 pages.

Resnik, et al., "Improving Translation via Targeted Paraphrasing", Conference on Empirical Methods in Natural Language Processing, MIT, Massachusetts, Oct. 9-11, 2010, 11 pages.

Callison-Burch, et al.,"Creating Speech and Language Data with Amazon's Mechanical Turk", Jun. 2010, 12 pages.

* cited by examiner

CROWDSOURCED, GROUNDED LANGUAGE FOR INTENT MODELING IN CONVERSATIONAL INTERFACES

BACKGROUND

Spoken conversational interfaces for computing devices have historically been hand-scripted. This involves anticipating a specific range of utterances that users might say, and mapping these anticipated utterances to specific states or actions in a machine. Similarly, dialog aimed at clarifying ambiguous input often needs to be hand-coded. For any new application, new hand-scripting is needed. In order to localize the functionality to any new language, new hand-scripting is also needed.

Verbally spoken, conversational data is complex, with nuances including relative terms, such as "make it bigger," ambiguous descriptions, such as "that looks good," and oblique expressions of the users' intent, such as "the labels are too noisy" or "can we make the chart look cleaner?" Currently, there are no general mechanisms for learning grounded natural language descriptions for a verbal interface. The verbal interfaces available are limited to specific domains with particular sets of recognized commands that have been hand-scripted, and of which a user needs specific knowledge in order to interact verbally within that domain. Also, users may lack the specific domain knowledge necessary to express their goals using terminology associated with that domain.

Existing techniques for constructing verbal interfaces present a number of drawbacks that adversely affect how much data can be explored, as well as the quality of the data and the accessibility to users. Accordingly, it is desirable to have grounding between natural language and machine state change in order to create a rich interaction for verbal interfaces. What is more, systems need to recognize a user's intent regardless of exactly how the user expresses that intent in natural language.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a system comprising a processor, a pre-processing component, and a conversational interface. The pre-processing component is implemented on the processor and configured to process data captured from a plurality of describers to generate a model. The conversational interface is configured to be trained using the model generated by the pre-processing component.

Another aspect is directed towards an apparatus comprising one or more stimuli, a data collection mechanism, and a model generation mechanism. The one or more stimuli are configured to be presented to a plurality of describers. The data collection mechanism is configured to capture describer data from the plurality of describers. The model generation mechanism is configured to process the describer data and generate a set of metadata documents.

Yet another aspect is directed towards a method for crowdsourcing conversational interfaces. One or more stimuli are presented to a plurality of describers. One or more sets of describer data are captured from the plurality of describers using a data collection mechanism. The one or more sets of describer data are processed to generate one or more models. Each of the one or more models is associated with a specific stimulus from the one or more stimuli.

Other advantages may become apparent from the following detailed description when taken in conjunction with the drawings.

BRIEF DESCRIPTION OF THE DRAWINGS

The present invention is illustrated by way of example and not limited in the accompanying figures, in which like reference numerals indicate similar elements. The advantageous embodiments, as well as a preferred mode of use, further objectives and advantages thereof, will best be understood by reference to the following detailed description of an advantageous embodiment of the present disclosure when read in conjunction with the accompanying drawings, wherein.

DETAILED DESCRIPTION

Various aspects of the technology described herein are generally directed towards a system and method for training a conversational interface. As will be understood, crowdsourcing provides for obtaining a broad range of natural language input, which can be used to train a conversational interface for rich verbal interaction, capable of modeling user intent.

While the various aspects described herein are exemplified with a conversational interface environment directed towards manipulating and/or controlling computer applications, it will be readily appreciated that other environments and subjects may benefit from the technology described herein. For example, the various aspects described herein may be used to perform queries within a collection of data.

Thus, as will be understood, the technology described herein is not limited to any type of environment, domain, or topic for verbal interfaces. As such, the present invention is not limited to any particular embodiments, aspects, concepts, protocols, structures, functionalities or examples described herein. Rather, any of the embodiments, aspects, concepts, protocols, structures, functionalities or examples described herein are non-limiting, and the present invention may be used in various ways that provide benefits and advantages in verbal interfaces in general, as well as possibly other interfaces.

Figure 1:
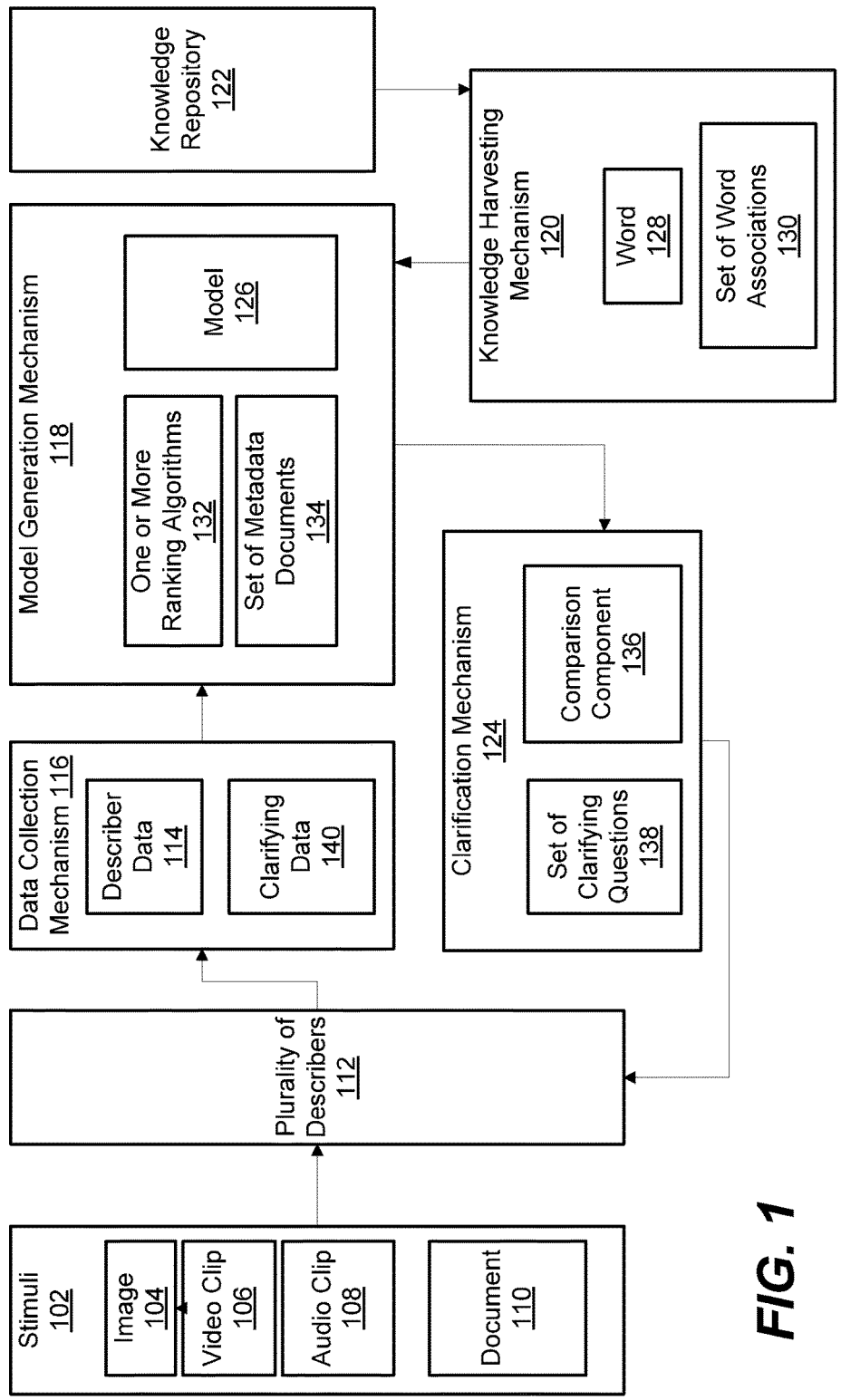
FIG. 1 is an illustrative example of a grounded crowdsourcing conversational interfaces environment in which an advantageous example embodiment may be implemented.

With reference now to the figures, FIG. 1 is an illustration of a crowdsourcing conversational interfaces environment in which advantageous embodiments of the present invention may be implemented. The crowdsourcing conversational interfaces environment 100 may be implemented at least in part on at least one processor in a computing environment, for example. Stimuli 102 may be, for example, without limitation, any representation of a state or change of state, such as an action or event, which may be applied to a human sensory receptor. In this example, the stimuli 102 include at least one of an image 104, a video clip 106, an audio clip 108, or a document 110. The image 104 may be, for example, without limitation, a static image, a code-generated animated graphical image, an animated bitmap image format, and/or any other suitable type of image. A code-generated animated graphical image may include, for example, without limitation, animations using dynamic hyper-text markup language (HTML), Microsoft® Silverlight®, Adobe® Flash®, Oracle® JavaScript®, and/or any other suitable framework or language. The document 110 may or may not be tied to one or more of the image 104, the video clip 106, or the audio clip 108.

For example, in one illustrative embodiment, the document 110 may include a set of questions that correspond to the image 104. In one illustrative example, the image 104 may be an image of a hat, and the set of questions within the document 110 may include questions such as: "what is this?", "what color is it?", "how would you describe this?", and the like. In another illustrative embodiment, the image 104 may be a Microsoft® Excel® spreadsheet, and the text within the document 110 may describe a task or set of tasks to be completed using the Microsoft® Excel® spreadsheet, for example. The stimuli 102 may be presented to a plurality of describers 112 in this illustrative example. As used herein, an image may be any representation of a code state that can be verbally characterized by humans, including, without limitation, a code state such as a spreadsheet table, a presentation slide, a SQL query, or a snippet of programming code. The stimulus may be realistic, such as a photograph, or abstract, such as skeletal images, and it may represent a single state or a change of state.

The grounded crowdsourcing conversational interfaces environment 100 may utilize the stimuli 102 to collect a broad range of natural language data from a plurality of describers 112. The plurality of describers 112, also recognized as a crowd, may be a network of people. The plurality of describers 112 may be an unspecified number and/or group of people with a common language. For example, in one illustrative implementation, the plurality of describers 112 may be an English-speaking crowd. In another illustrative implementation, the plurality of describers 112 may be a Spanish-speaking crowd, or any other suitable language, for example. Depending on the purposes of the task, the plurality of describers 112 may or may not have specific expertise in a domain. In many cases, it will be advantageous to collect descriptions from humans with varying degrees of expertise in the subject domain, to capture the full range of ways that people might express a particular intent. The plurality of describers 112 receives the stimuli 102 and produces describer data 114, which is captured by a data collection mechanism 116. The describer data 114 may be a set of natural language descriptions associated with a stimulus from the stimuli 102 presented to the plurality of describers 112. The describer data 114 includes the natural language descriptions captured for each describer in the plurality of describers 112.

While the illustrative example shows one set of the describer data 114, different advantageous embodiments may provide multiple sets of describer data, where each set of describer data corresponds to a specific stimulus. Further, where each set of describer data is a collection of natural language descriptions that corresponds to one stimulus, such as an image, each collection of natural language descriptions includes the input from each describer in the crowd that received the image, for example. In other words, if a crowd of five hundred people received the image of a hat, the describer data captured that corresponds to the image of the hat would be a set of the natural language descriptions of the hat from each of the five hundred people in the crowd.

In one illustrative example, where an example stimulus is an image of an object, the describer data 114 may include natural language descriptions that describe the nature of the object, the physical attributes of the object, the aesthetics of the object, and/or any other suitable descriptions. In this example, where the example image is a hat, the natural language descriptions may include words or phrases such as: "a green hat," "a striped green hat," "a cap," "a men's hat," "a winter hat," "a hat that keeps you warm," "a green and yellow hat," and so on. By capturing all these different ways of describing the same semantic intent—that hat—the technique allows linguistic flexibility in referring to this object. When this data is deployed in a conversational interface, users can now refer to "a warm green hat" even though this description has not previously been seen. This ability to model intent, regardless of how that intent might expressed, is a key advantage.

In one illustrative example, where an example stimulus represents a change of machine state, the describer data 114 may have been elicited in a manner to obtain descriptions of an intended action from different perspectives in order to obtain specific types of linguistic information grounded in the change of state. For example, instructions to the plurality of describers 112 may seek to elicit different commands given to a computer and more indirect negotiations to achieve the same change when given to a human coworker.

The grounded crowdsourcing conversational interfaces environment 100 includes a model generation mechanism 118, a knowledge harvesting mechanism 120, a knowledge repository 122, and a clarification mechanism 124. The model generation mechanism 118 uses the describer data 114 captured from the plurality of describers 112 to generate a model 126 used in training a conversational interface. The knowledge harvesting mechanism 120 interacts with the knowledge repository 122 to provide word associations that the model generation mechanism 118 may use to refine the describer data 114 when generating the model 126. The knowledge repository may be any language repository, such as, without limitation, the Web, for example. The knowledge harvesting mechanism 120 may query the knowledge repository 122 with a word 128 to retrieve a set of word associations 130 corresponding to the word 128. In an illustrative example, the word 128 may be "hair" and the set of word associations 130 returned for "hair" may include a number of words associated with "hair," such as, without limitation, "brown," "black," "curly," "straight," "messy," "cut," "shaggy," "long," "short," and/or any other suitable word that is associated with "hair" in natural language. This limited illustrative example demonstrates the vast range of natural language data that may be associated with just one single word, which may be one of many words included in the describer data 114 corresponding to a single stimulus, such as the image 104, for example.

The model generation mechanism 118 uses the set of word associations 130 and/or one or more ranking algorithms 132 to process the describer data 114. The processing of the describer data 114 using the set of word associations 130 and/or one or more ranking algorithms 132 may include filtering and/or clustering the describer data 114 to refine the data to a set of metadata documents 134. The set of metadata documents 134 may be a collection of relevant words and/or phrases associated with the stimulus corresponding to the describer data 114. For example, if the stimulus used is the image 104, the set of metadata documents 134 is associated with the image 104. Each metadata document in the set of metadata documents 134 may correspond to a specific describer in the plurality of describers 112, in one illustrative implementation. Thus, in this example, each metadata document corresponds to a specific describer in the crowd, and a specific stimulus introduced to the crowd.

The clarification mechanism 124 includes a comparison component 136 that processes the set of metadata documents 134 to identify the commonalities and differences in the set of metadata documents 134. The comparison component 136 identifies ambiguities, such as relative terms or descriptive words having more than one meaning. The clarification mechanism 124 uses the ambiguities identified by the comparison component 136 to generate a set of clarifying questions 138. The set of clarifying questions 138 may be presented to the plurality of describers 112. The plurality of describers 112 may respond to the set of clarifying questions 138 by producing clarifying data 140, which is captured by the data collection mechanism 116.

The model generation mechanism 118 uses the clarifying data 140 to further refine the set of metadata documents 134 and generate the model 126. The model 126 is associated with a specific stimulus, such as the image 104 of the stimuli 102, for example. Although only one model is shown in this illustrative implementation, the model generation mechanism 118 may generate a model for each stimulus presented to the plurality of describers 112. The resulting collection of models may be used to train a conversational interface, providing the grounding in natural language needed to model user intent in a rich verbal interaction with the machine.

FIG. 1 is intended as an example, and not as an architectural limitation for different embodiments. For example, in other advantageous embodiments, the crowdsourcing conversational interfaces environment 100 may have other stimuli presented to a plurality of describers. In yet other advantageous embodiments, the plurality of describers may include one or more sets of describers, where each set of describers includes a number of people with a common language. In this example, the model generation and subsequent training of a conversational interface may be provided for any language with a crowd available for crowdsourcing.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

As used herein, when a first component is connected to a second component, the first component may be connected to the second component without any additional components. The first component also may be connected to the second component by one or more other components. For example, one electronic device may be connected to another electronic device without any additional electronic devices between the first electronic device and the second electronic device. In some cases, another electronic device may be present between the two electronic devices connected to each other.

The different advantageous embodiments recognize and take into account that current techniques for verbal interfaces have a number of drawbacks that adversely affect how much data can be explored, as well as the quality of the data and the accessibility to users. These drawbacks are due in part to the fact that current methods for verbal interfaces require hand-scripting, which are updated for each application or program desired for use with the verbal interface. Additionally, there is no grounding in natural language for the existing verbal interface technologies, which results in limited use and accessibility.

Thus, various aspects of the subject matter described herein are directed towards a system comprising a processor, a pre-processing component, and a conversational interface. The pre-processing component is implemented on the processor and configured to process data captured from a plurality of describers to generate a model. The conversational interface is configured to be trained using the model generated by the pre-processing component.

Another aspect is directed towards an apparatus comprising one or more stimuli, a data collection mechanism, and a model generation mechanism. The one or more stimuli are configured to be presented to a plurality of describers. The data collection mechanism is configured to capture describer data from the plurality of describers. The model generation mechanism is configured to process the describer data and generate a set of metadata documents.

Yet another aspect is directed towards a method for crowdsourcing conversational interfaces. One or more stimuli are presented to a plurality of describers. One or more sets of describer data are captured from the plurality of describers using a data collection mechanism. The one or more sets of describer data are processed to generate one or more models. Each of the one or more models is associated with a specific stimulus from the one or more stimuli.

Figure 2:
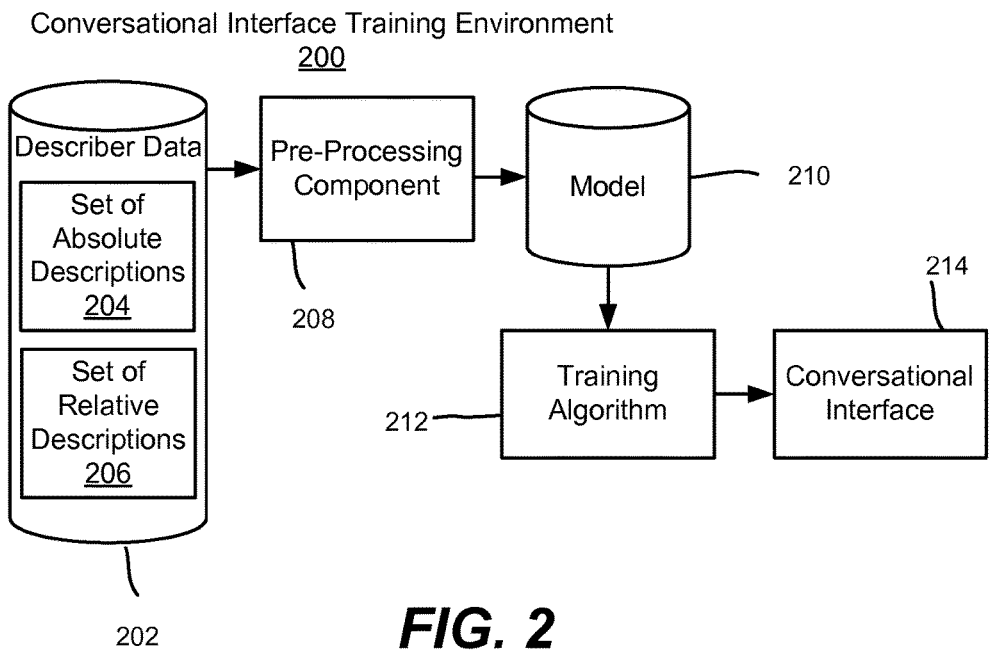
FIG. 2 is a block diagram illustrating an example of a conversational interface training environment in accordance with an advantageous example embodiment.

With reference now to FIG. 2, an illustration of a conversational interface training environment is depicted in accordance with an advantageous embodiment. The conversational interface training environment 200 may be an illustrative example of one implementation of the crowdsourcing conversational interfaces environment 100 in FIG. 1.

Describer data 202 may be an illustrative example of one implementation of the describer data 114 in FIG. 1. The describer data 202 may be captured by the data collection mechanism 116 from the plurality of describers 112 in FIG. 1, for example. The describer data 202 may include one or more different types of descriptions captured from the plurality of describers 112. For example, the describer data 202 may include a set of absolute descriptions 204, a set of relative descriptions 206, and/or any other suitable type of description. Some other types of descriptions captured may include, without limitation, multilingual descriptions, color descriptions, emotion descriptions, conceptual descriptions, and/or any other suitable type of description.

The pre-processing component 208 filters the describer data 202 to identify the set of absolute descriptions 204 and the set of relative descriptions 206, and clusters together similar data. The pre-processing component 208 may be an illustrative implementation of the model generation mechanism 118, the knowledge harvesting mechanism 120, and the clarification mechanism 124, for example. The pre-processing component 208 generates a model 210, which is used along with a training algorithm 212 to train a conversational interface 214.

The illustration of the conversational interface training environment 200 in FIG. 2 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

With reference to FIG. 3, an illustration of a conversational interface environment 300 is depicted in accordance with an advantageous embodiment. The conversational interface environment 200 may be an illustrative example of a conversational interface trained in the crowdsourcing conversational interfaces environment 100 in FIG. 1.

Describer data 302 may be an illustrative example of one implementation of the describer data 114 in FIG. 1. The pre-processing component 304 filters the describer data 302 and clusters together similar data. The pre-processing component 304 may be an illustrative implementation of the model generation mechanism 118, the knowledge harvesting mechanism 120, and the clarification mechanism 124, for example. The pre-processing component 304 generates a model 306, which is used along with a training algorithm 308 to train a conversational interface 310.

The conversational interface 310 receives verbal input 312 from a user, such as a person speaking conversationally to an interface, for example. The verbal input 312 may be a command, a query, and/or any other suitable input. The conversational interface 310 receives the verbal input 312 and generates a machine state change 314. The machine state change 314 may be a specific machine behavior that corresponds to the verbal input 312. For example, if the verbal input 312 is "I want to send an email to John Smith," the machine state change 314 may be to open a messaging program, if it is not already open, and generate a new message template with the address of "John Smith" in the "send to" cell. In another illustrative example, where the conversational interface is a gaming interface using avatars, if the verbal input 312 is "put a blue hat on my avatar's head," the machine state change 314 may be to render a representation of the avatar wearing a blue hat, for example.

In yet another illustrative embodiment, the verbal input 312 may be a query submitted to conversational interface 310. The machine state change 314 in this example may be to perform the search to return a result, which may be presented as output 316, in one illustrative example.

Figure 3:
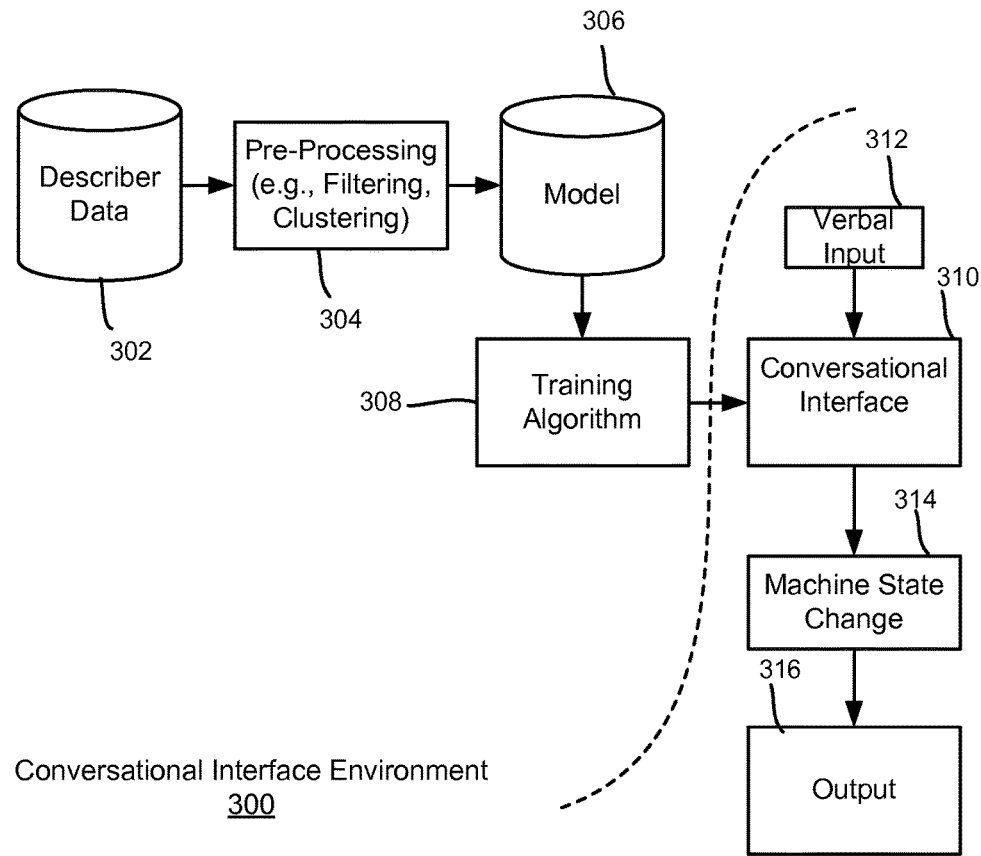
FIG. 3 is a block diagram illustrating an example of a conversational interface environment in accordance with an advantageous example embodiment.

The illustration of the conversational interface environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

The different advantageous embodiments recognize and take into account that current techniques for verbal interfaces have a number of drawbacks that adversely affect how much data can be explored, as well as the quality of the data and the accessibility to users. These drawbacks are due in part to the fact that current methods for verbal interfaces require hand-scripting, which are updated for each application or program desired for use with the verbal interface. Additionally, there is no grounding in natural language for the existing verbal interface technologies, which results in limited use and accessibility.

Thus, the different advantageous embodiments provide a system and methods for a robust conversational interface grounded in natural language.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Exemplary Operating Environment

Figure 4:
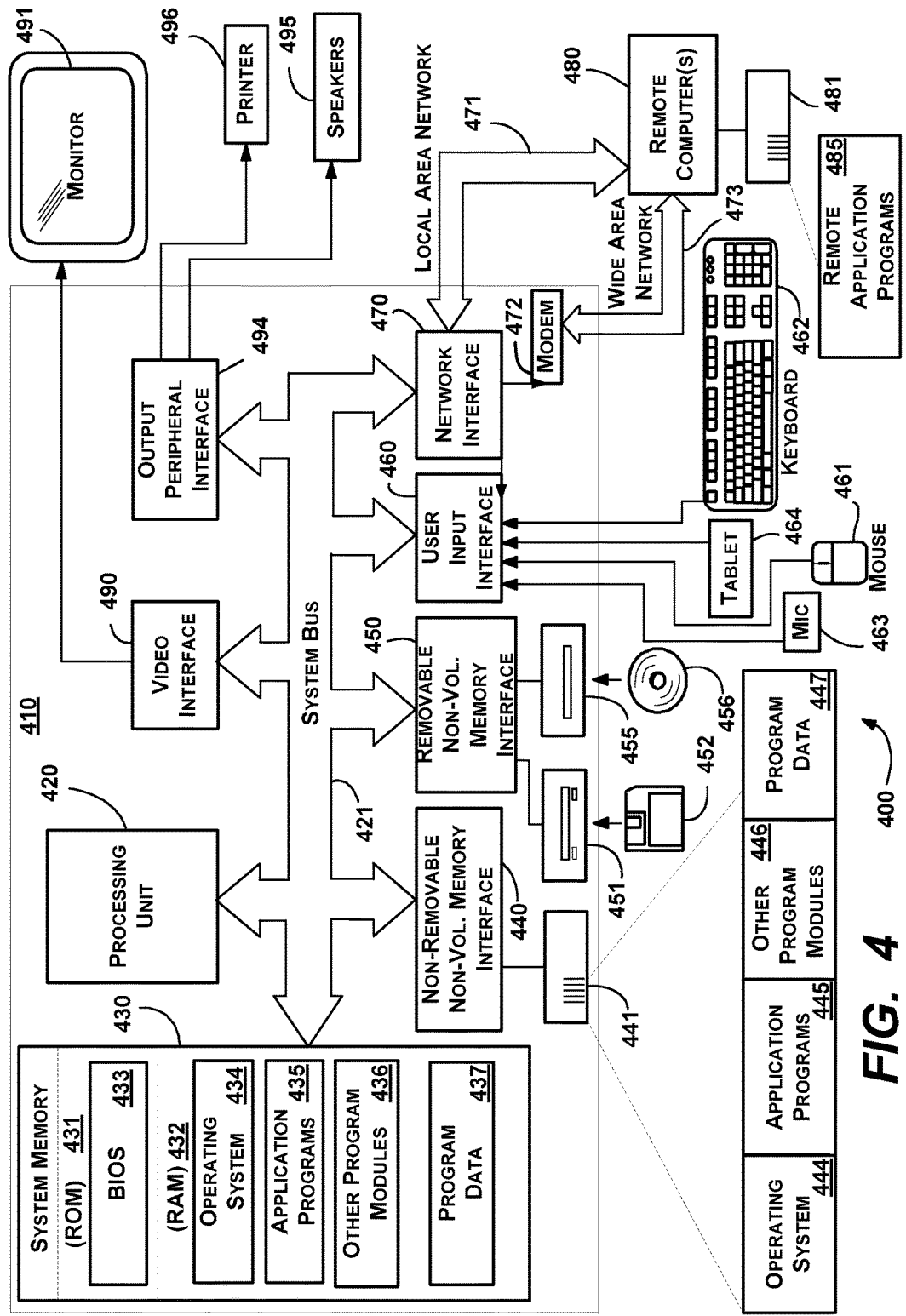
FIG. 4 is a block diagram representing an example computing environment into which aspects of the subject matter described herein may be incorporated.

FIG. 4 illustrates an example of a suitable computing and networking environment 400 on which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, touch screen, gesture recognition module, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 *include* one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising:
one or more processors;
a model generation mechanism configured to:
   identify a first set of data;
   based on the identified first set of data, select a plurality of users;
   present the first set of data to the selected plurality of users; and
   process a second set of data captured from the selected plurality of users in response to the first set of data presented to the selected plurality of users to generate metadata documents that correspond to respective users of the selected plurality of users;
a clarification mechanism configured to:
   process the metadata documents;
   based on the processing, identify ambiguities in the metadata documents, the ambiguities comprising relative terms or descriptive words having more than one meaning;
   generate a set of clarifying questions based on the identified ambiguities; and
   present the set of clarifying questions to the selected plurality of users;
a data collection mechanism configured to capture clarifying data from the selected plurality of users in response to the presentation of the set of clarifying questions;
the model generation mechanism further configured to:
   refine the metadata documents based on the clarifying data; and
   generate a model that provides natural language descriptions of the first set of data based on the refined metadata documents and the clarifying data; and
a conversational interface configured to be trained using the model generated by the model generation mechanism to determine a meaning behind a verbal communication from a user.

2. The system of claim 1, wherein the metadata documents further correspond to the first set of data.

3. The system of claim 1, wherein the conversational interface is further configured to be trained using a training algorithm in conjunction with the model.

4. The system of claim 1, wherein the conversational interface receives a verbal input that triggers a machine state change.

5. The system of claim 1, wherein the first set of data includes a stimuli and a plurality of questions associated with the stimuli.

6. The system of claim 5, wherein the stimuli is a representation of a state or change of state of an action or event that can be applied to a human sensory receptor.

7. An apparatus, comprising:
a processor programmed to:
   identify a first set of data;
   based on the identified first set of data, select a plurality of users; and
   present the first set of data to the selected plurality of users;
   a data collection mechanism configured to capture a second set of data from the selected plurality of users in response to the first set of data presented to the selected plurality of users;
   a model generation mechanism configured to:
      process the second set of data; and
      generate a model that provides natural language descriptions of the first set of data, the generated model including a set of metadata documents associated with the first set of data; and
   a clarification mechanism configured to:
      process the metadata documents; and
      based on the processing, identify ambiguities in the set of metadata documents, the ambiguities comprising relative terms or descriptive words having more than one meaning; and
      generate a set of clarifying questions based on the identified ambiguities, wherein the set of clarifying questions are presented to the selected plurality of users, and wherein the data collection mechanism captures clarifying data from the selected plurality of users in response to the presentation of the set of clarifying questions;
   the model generation mechanism further configured to:
      refine the metadata documents based on the clarifying data; and
      refine the generated model based on the refined metadata documents and the clarifying data.

8. The apparatus of claim 7, wherein the first set of data is a representation of a state or change of state.

9. The apparatus of claim 7, wherein the selected plurality of users are a crowd of people.

10. The apparatus of claim 7, wherein the second set of data corresponds to the first set of data presented to the selected plurality of users.

11. The apparatus of claim 7, wherein the model generation mechanism includes one or more ranking algorithms used to process the second set of data.

12. The apparatus of claim 7 further comprising:
a knowledge repository; and
a knowledge harvesting mechanism configured to interact with the knowledge repository to generate a set of word associations.

13. The apparatus of claim 12, wherein the model generation mechanism uses the set of word associations generated by the knowledge harvesting mechanism along with the one or more ranking algorithms to process the second set of data and generate the set of metadata documents.

14. The apparatus of claim 7, wherein the stimuli is an image.

15. A method comprising:
identify a first set of data;
based on the identified first set of data, select a plurality of users;
presenting the first set of data to the selected plurality of users for determining a meaning behind a verbal communication from a user in conversational interfaces, the first set of data comprising a stimuli and questions regarding the stimuli;
capturing a second set of user data in response to the second set of data from the selected plurality of users using a data collection mechanism;
processing, by a processor, the second set of data;
based on processing the second set of data, generate metadata documents that correspond to respective users of the selected plurality of users;
process the metadata documents;

based on processing the metadata documents, identify ambiguities in the second set of data, the ambiguities comprising relative terms or descriptive words having more than one meaning;

generate, by the processor, a set of clarifying questions based on the identified ambiguities;

present the set of clarifying questions to the selected plurality of users;

capture clarifying data from the selected plurality of users in response to the presentation of the set of clarifying questions;

refine the metadata documents based on the clarifying data; and generate, by the processor, one or more models that provide natural language descriptions of the first set of data based on the refined metadata documents and the clarifying data.

16. The method of claim 15, wherein the second set of data comprises a collection of natural language descriptions associated with the first set of data.

17. The method of claim 15, wherein processing the second set of data comprises filtering and clustering the second set of data to generate the metadata documents, wherein the metadata documents correspond to a set of data from the first set of data, and wherein a subset of metadata documents in the metadata documents correspond to a respective user from the selected plurality of users.

18. The method of claim 15, wherein processing the second set of data comprises refining the second set of data using a set of word associations generated by a knowledge harvesting mechanism to generate the metadata documents.

19. The method of claim 15 further comprising:
training a conversational interface using the one or more models.

20. The method of claim 19, wherein training a conversational interface using the one or more models comprises determining a meaning behind a verbal communication from a user.

* * * * *